United States Patent [19]

Darley

[11] Patent Number: 6,082,953
[45] Date of Patent: Jul. 4, 2000

[54] APPARATUS FOR TRANSPORTING VALUABLES

[76] Inventor: Billy F. Darley, Poorthoflann 15, 2180 Ekeren, Belgium

[21] Appl. No.: 09/006,908

[22] Filed: Jan. 14, 1998

[30] Foreign Application Priority Data

Jan. 14, 1997 [BE] Belgium ............................. 09700034

[51] Int. Cl.$^7$ ..................................................... F41H 7/00
[52] U.S. Cl. ........................ 414/401; 414/390; 414/396; 414/398; 414/402; 414/468
[58] Field of Search ..................... 414/373, 399, 414/396, 398, 401, 402, 468, 529, 679, 584

[56] References Cited

U.S. PATENT DOCUMENTS

| | | | |
|---|---|---|---|
| 1,664,517 | 4/1928 | Liebl | 414/390 X |
| 1,883,493 | 10/1932 | Berg | 414/390 |
| 2,589,988 | 3/1952 | Bruno | 414/679 X |
| 2,784,859 | 3/1957 | Brownlee et al. | 414/468 X |
| 3,263,943 | 8/1966 | Share et al. | 243/1 |
| 4,298,303 | 11/1981 | Ritschel | 414/396 X |
| 4,403,803 | 9/1983 | Szendrodi et al. | 414/390 X |
| 4,792,995 | 12/1988 | Harding | 414/398 X |
| 5,142,658 | 8/1992 | McMorran et al. | 414/396 X |
| 5,803,701 | 9/1998 | Filiberti et al. | 414/390 X |

FOREIGN PATENT DOCUMENTS

| | | |
|---|---|---|
| 2 614 012 | 10/1988 | France . |
| 2 674 197 | 9/1992 | France . |
| 1 312 921 | 4/1973 | United Kingdom . |
| WO 85/04741 | 10/1985 | WIPO . |
| WO 94/15812 | 7/1994 | WIPO . |

*Primary Examiner*—Douglas Hess
*Attorney, Agent, or Firm*—Bacon & Thomas PLLC

[57] ABSTRACT

An apparatus for transporting valuables is provided which comprises at least a vehicle (2) provided with a loading space (3) with containers (4) for valuables (5) which may be received therein, removed therefrom, respectively. The apparatus also includes a loading arrangement for loading the containers (4) in the loading space (3), removing them therefrom, respectively.

15 Claims, 4 Drawing Sheets

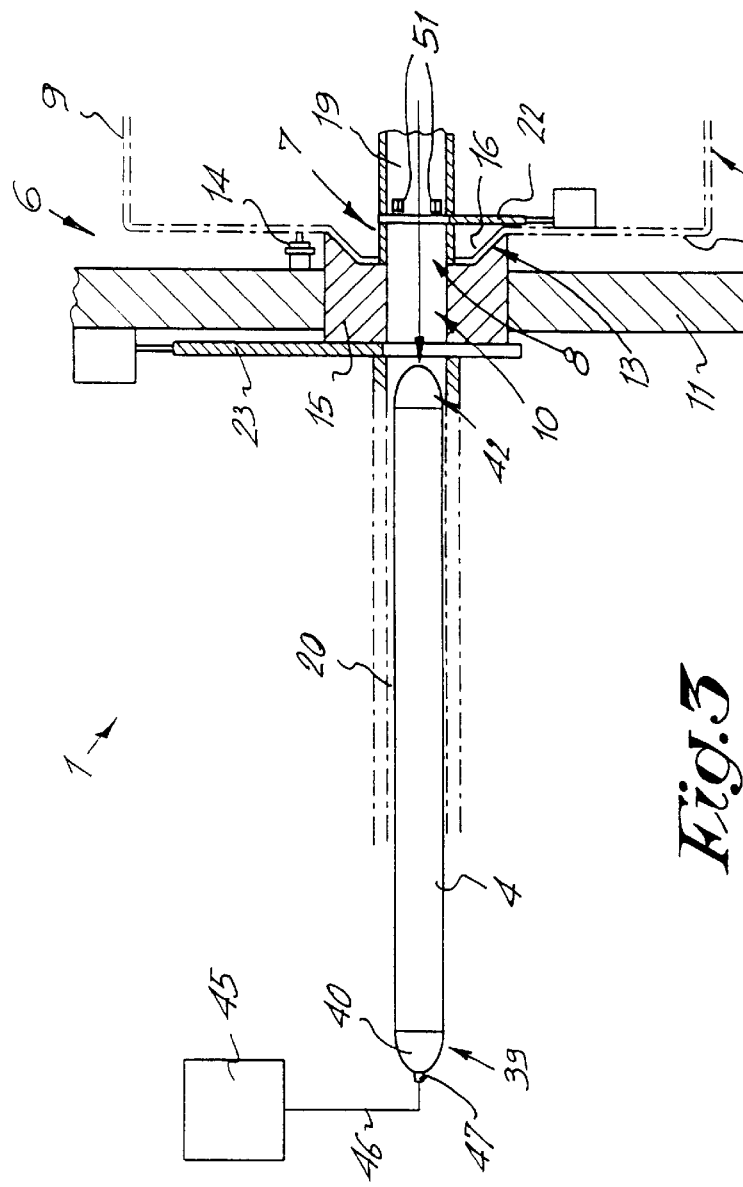
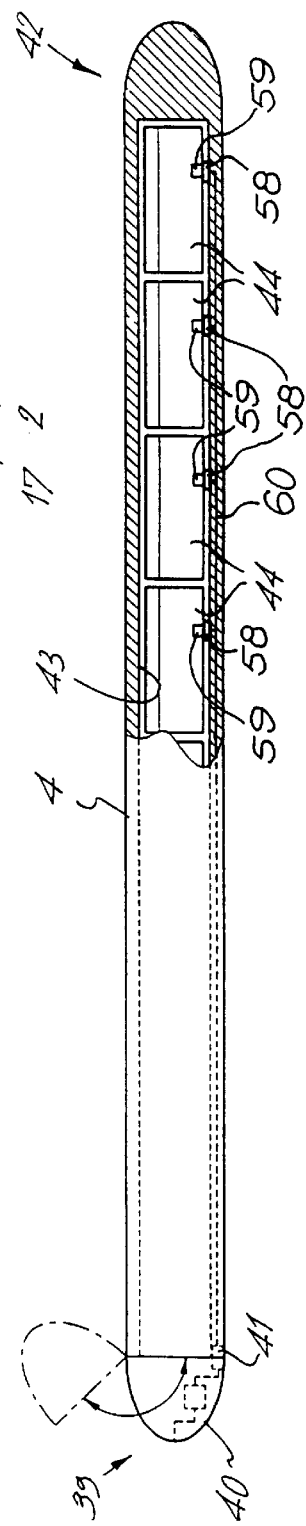
Fig.3
Fig.5

APPARATUS FOR TRANSPORTING VALUABLES

BACKGROUND OF THE INVENTION

1. Field of the Invention

The present invention relates to an apparatus for transporting valuables, money in the first instance, but in general also other valuables such as jewelry, precious stones, precious metals, paper securities and so forth.

SUMMARY OF THE INVENTION

The invention hereby aims at an apparatus which is designed for the safe transport of such valuables over the public road.

The aim of the invention is to provide an apparatus which is built in such a way that stealing the valuables by an armed hold-up is made almost impossible.

To this end, the invention provides an apparatus for transporting valuables which comprises: at least a vehicle which is provided with a loading space with containers for valuables which may be received therein, removed therefrom, respectively; and a loading arrangement for loading these containers in the loading space, and unloading them therefrom, respectively.

Preferably, the apparatus further comprises at least one station for the unloading and/or loading of such containers and the loading arrangement comprises a transport system for the containers, which allows for making a connection between the station and the loading space of the vehicle in order to move the containers from the loading space into the station and/or to move the containers from the station into the loading space.

Because of the presence of the transport system, the containers may be loaded and/or unloaded without human intervention, resulting in that this action need not be executed by an escort or a driver of the vehicle. Because of this direct and automatic transfer between the loading space and the station, it is possible to use particularly heavy and solid containers which are difficult to take away and crack in case of a brutal hold-up.

Preferably the transport system comprises a gate at the height of an outer wall of the vehicle, as well as a corresponding gate in a wall at the station, whereby both gates are positioned in such a way that they may be placed opposite one another by positioning the vehicle with the outer wall in which the gate is located directly in front of, and possibly against, the wall of the station in which the corresponding gate is located. In this way, the transport system has no weak spots which would allow a container to be intercepted during the transfer.

In the most preferred embodiment, each concerned vehicle is provided with a loading space formed of a drum system, whereby the containers are stored in a plurality of openings in a drum of this drum system, and whereby the different openings may be presented to the transport system. This drum system offers the advantage that in case of a hold-up with heavy explosives the drum is deformed at the most causing the containers to be locked in the openings of the drum and making it impossible to remove the containers in a short time.

More specifically, it is preferred that containers are used with a minimum weight of at least 150 kilograms, so that, in case they are removed from the vehicle during a hold-up, they are almost impossible to carry.

In the most preferred embodiment, oblong containers will be used, preferably in the shape of a torpedo. Such oblong containers offer the advantage that they are very appropriate to be stored in a drum system. The torpedo shape offers the advantage that a container is obtained which is round and smooth at all sides and therefore difficult to carry manually, which imposes difficulties in case of a possible theft.

BRIEF DESCRIPTION OF THE DRAWINGS

In order to better show the characteristics of the invention, preferred embodiments are described hereinafter, as examples without any limiting character whatsoever, reference being made to the accompanying drawings, in which:

FIG. 3 schematically represents a cross-section according to line III—III in FIG. 1, for another position;

FIG. 5 represents in an enlarged view the container which is indicated with F5 in FIG. 1;

DETAILED DESCRIPTION OF THE PREFERRED EMBODIMENTS

Figure 1:
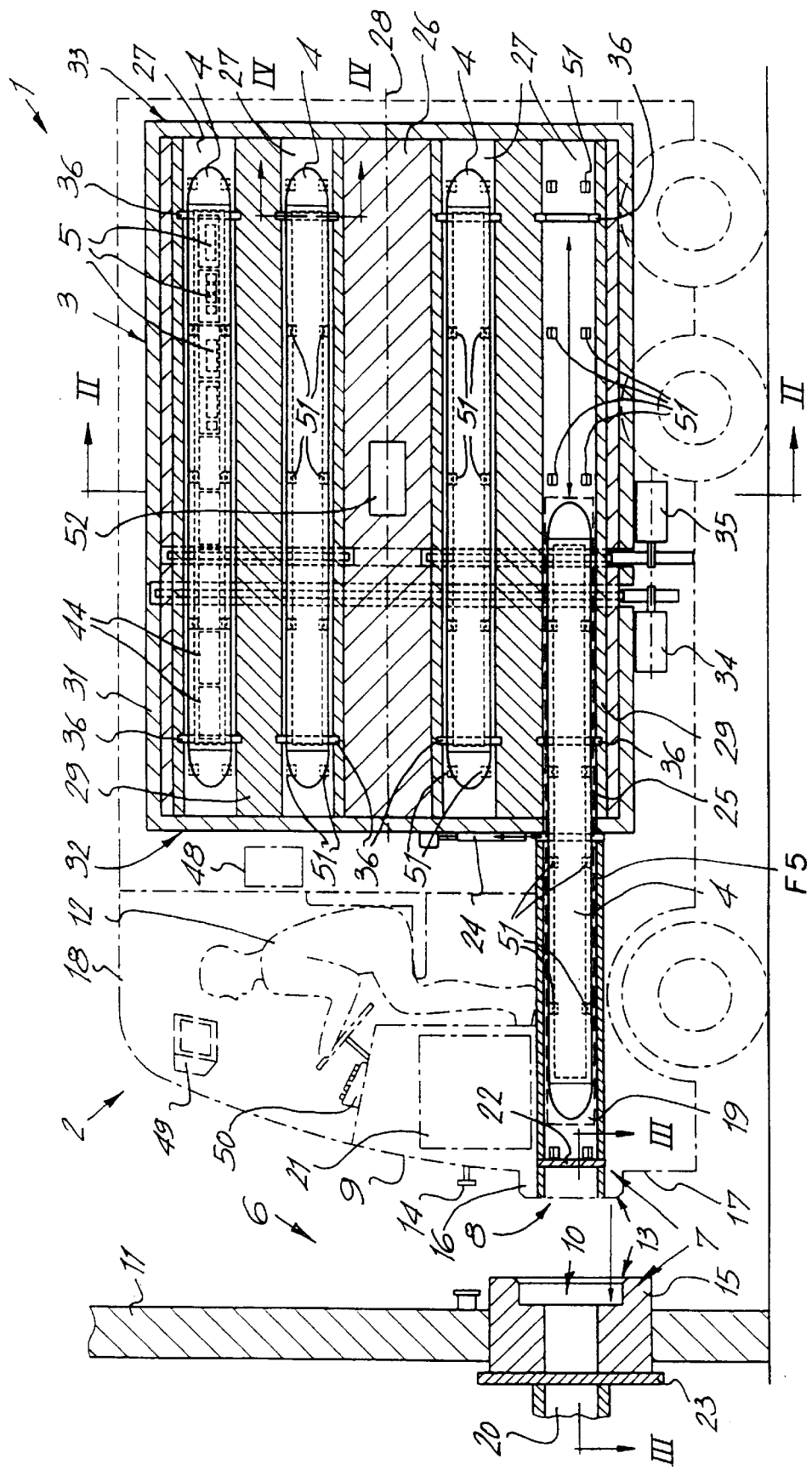
FIG. 1 schematically represents an apparatus according to the invention.
Figure 2:
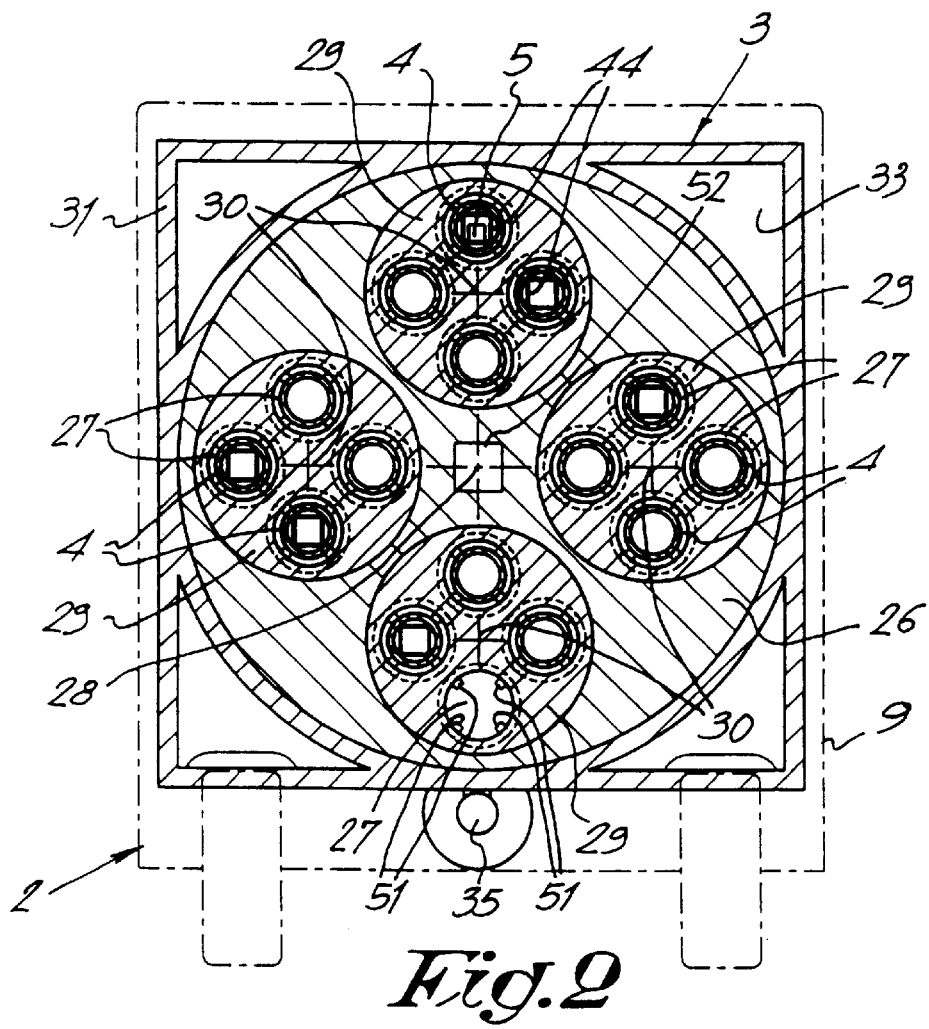
FIG. 2 represents a cross-section according to line II—II in FIG. 1.

As represented in FIGS. 1 and 2, an apparatus 1 according to the invention comprises: a combination of a vehicle 2 provided with a loading space 3 with removable containers 4 for storing valuables 5; at least one station 6 for unloading and/or loading containers 4; a transport system 7 for containers 4 which allows for making a connection between station 6 and loading space 3 of vehicle 2 in order to bring containers 4 from loading space 3 into station 6 and/or to bring containers 4 from station 6 into loading space 3.

Vehicle 2 may be of a various nature. Preferably it will be an armoured van.

Station 6 indicates the place where valuables 5 are to be delivered and/or valuables 5 are to be collected. In reality, station 6 will, for instance, be part of a bank affiliation so that money and the like may be supplied and carried off in a safe way. Hereby, the intention is that all bank affiliates are provided with station 6.

According to the invention, concerned stations 6 and vehicles 2 used therewith are designed in such a way that containers 4 may be brought directly from vehicle 2 into station 6 by driving vehicle 2 up against station 6.

As represented in FIG. 1, transport system 7 preferably comprises a gate 8 at the height of an outer wall 9 of vehicle 2 and a corresponding gate 10 in a wall 11 of station 6, whereby both gates 8–10 are situated such that they may be placed opposite one another by positioning vehicle 2 with outer wall 9 in which gate 8 is located directly in front of, and possibly against, wall 11 of station 6 in which corresponding gate 10 is located.

Gate 8 is preferably located in a front wall of vehicle 2 because this offers the advantage that a driver 12 may easily position vehicle 2 at the correct place in front of station 6.

Preferably the whole is provided with a positioning system which allows a correct positioning of vehicle 2 with respect to station 6. This positioning system may be of a various nature. In the represented examples of FIGS. 1 and 3, use is made of a mechanical positioning system 13 and an opto-electronic positioning system 14, respectively.

Mechanical positioning system 13 comprises connection parts 15 and 16 at station 6 and vehicle 2, respectively, which fit into each other, one part in the form of a sort of buffer with a conically narrowing seat and the other part in the form of a protrusion which, for instance, may form a part of a bumper 17 of vehicle 2.

Opto-electronic positioning system 14 comprises an infrared guidance system which allows driver 12 of vehicle 2 to bring vehicle 2 into the correct position when approaching wall 11. This may for instance be done by reading a signal which is displayed on a display or the like in a driver's cabin 18.

It is clear that other positioning systems are not excluded. First connection part 15 may for instance be applied movably in wall 11, whereby the positioning takes place by first positioning vehicle 2 at the height of station 6 in front of wall 11 and subsequently moving first connection part 15 sideways, for instance automatically, until it is located precisely in front of second connection part 16.

Transport system 7 further comprises: a channel 19 which is, for instance, formed by a solid tube and which extends in vehicle 2 from loading space 3 to gate 8; and a space 20 in station 6, preferably also in the shape of a channel, in which container 4 may be received or be put ready for transport, respectively. As represented, channel 19 extends under driver's cabin 18, preferably under an engine 21 of vehicle 2. As a result, channel 19 is hard to reach from the outside and also well protected in case of a hold-up or the like with explosives.

In the represented examples, gates 8 and 10 may be closed by outer shutters 22-23. Furthermore, several intermediate shutters can be provided, for instance an intermediate shutter 24 at an access opening 25 of loading space 3.

Loading space 3 is, as represented in FIGS. 1 and 2, preferably designed in the form of a drum system with a revolving drum 26 in which a plurality of storage rooms 27 are applied. Drum 26 preferably has a horizontal rotating shaft 28 which extends in a longitudinal direction of vehicle 2 and has a diameter which is almost equal to the width of vehicle 2.

In drum 26, a plurality of secondary drums 29, preferably four, are applied which may be rotated along a plurality of secondary rotating shafts 30 which are parallel to rotating shaft 28. In each secondary drum 29, four storage rooms 27 are provided.

Storage rooms 27 in the represented example comprise cylindrical channels which extend in an axial direction through drum 26, and more specifically through secondary drums 29.

Drum 26 is mounted together with secondary drums 29 in a solid housing 31, in the shape of a cell, which also assures that storage rooms 27 are closed at their extremities by a first wall 32 and a second wall 33 extending along them.

Access opening 25 is preferably located at a bottom in first wall 32 in a direct line with the bottommost storage room.

The revolving of the drum system is done by one or more drives, in this case a drive 34 for drum 26 and a secondary drive 35 which co-operates with the bottommost secondary drum.

Containers 4, as represented, preferably comprise oblong receptacles, preferably in the shape of a torpedo. The whole is preferably provided with various locking mechanisms.

Figure 4:
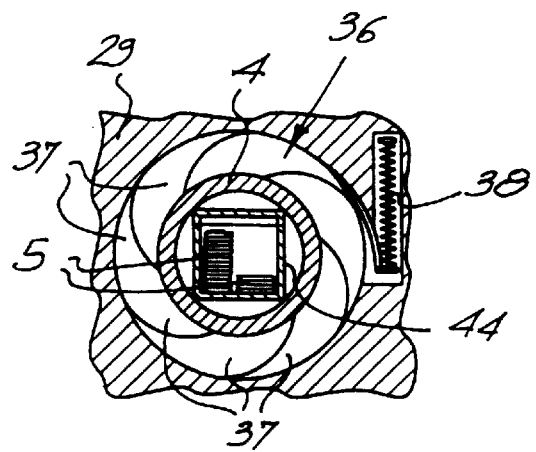
FIG. 4 represents more in detail a cross-section according to line IV—IV in FIG. 1.

In the examples of the figures, containers 4 are clamped by a plurality of diaphragm-shaped or iris-shaped clamping elements 36, for instance in the shape of rubber fins 37 which, as represented in FIG. 4, close themselves around containers 4, for instance under the influence of the force of a spring 38, whereby unlocking takes place by a drive mechanism which is not represented.

It is clear that other locking mechanisms may be provided for blocking drum 26 and/or secondary drums 29.

Torpedo-shaped containers 4 may, as represented in FIG. 4, preferably be opened at a first extremity 39, which is provided to this end with a removable head 40. Head 40 is provided with a secured lock 41, which may for instance only be opened by a code.

A second extremity 42 of container 4 preferably comprises a massive material, for instance steel. The intention thereof is that containers 4 are loaded in vehicle 2 with second extremity 42 directed backwards. Massive second extremity 42 prevents an opening being made by explosives in a rear side of vehicle 2, which would extend into a storage space 43 of container 4.

Containers 4 preferably have a weight of 150 kilograms in empty condition, making them difficult to carry manually. This weight may be obtained by providing containers 4 with a thick steel wall.

Valuables 5 may either be put loosely in storage space 43, or in boxes or cases 44.

The whole is preferably provided with a data network or is connected to a data network with a computer unit 45 at each station 6, which allows delivered containers 4 to only be opened by an appropriate code. To this end, possibly a connection 46 may be realized by a plug system 47 or the like.

In each container 4, more specifically in head 40 thereof, a chip is integrated for storing data concerning the contents of container 4, as well as for storing possible codes and the like.

Vehicle 2 will preferably be provided with an on-board computer 48 and a display screen 49 and keyboard 50 connected therewith, for entering ride data, retrieving it, respectively.

The working and use of the apparatus is mainly as follows.

In concerned stations 6, between which the transport is to be done, containers 4 are loaded with valuables 5 to be transferred. Also electronic information is stored in the chip of head 40 relating to the contents, the origin, the destination and so forth. This information is preferably also transmitted to concerned stations 6 by, for instance, an existing data network, for instance the known Banksys system.

The transport company is only informed of the place of origin and the place of destination. Driver 12 receives this information at the start of the ride by on-board computer 48, or by a chip card which is charged beforehand, and display screen 49.

The transfer of container 4 between station 6 and vehicle 2 may preferably only take place after a check has been done by computer unit 45.

It is clear that the necessary protections are provided which ensure that containers 4 may only be moved when vehicle 2 is present at station 6. The movement itself preferably takes place automatically, for instance, by the fact that the containers may be rolled in the longitudinal direction by a plurality of rollers 51 which may be driven by a drive, which is not represented. Of course other drives may be used to move containers 4.

During the transport by vehicle 2, shutters 22-23-24 are of course closed.

It is clear that a data connection may be realized between computer unit 45 and on-board computer 48, in order to exchange recognition codes during the loading and unloading, in order to avoid containers 4 being delivered at the wrong place, whereby shutters 22 and 24 may only be opened when vehicle 2 is at the correction station.

It is clear that in this way money transports between different bank affiliates, principal seats, the National Bank and the like may be executed in a safe way.

The invention also relates to an apparatus whereby stations 6 comprise cash dispensers or comprise units which co-operate with such cash dispensers, whereby stations 6 are provided with an inserting mechanism which allows for money, which is supplied by the containers 4, to be automatically inserted in the cash dispensers. Containers 4 may then be loaded with money cassettes which are automatically removed from containers 4 in station 6 and inserted in the corresponding dispenser. A known money cassette for use with a cash dispenser is described in the published international patent application WO 85/04741, which is incorporated herein by reference.

The cash dispensers are hereby preferably realized in such a way that they may be loaded with containers 4 at the front.

The whole may be provided with a transmitter unit 52, which is preferably integrated in drum 26, by which a localization by a satellite may be done, in case vehicle 2 is stolen.

Although the drum system and the use of torpedo-shaped containers 4 is preferred, it is clear that other forms of cell-shaped loading spaces 3 and containers 4 may be used. In the case of an apparatus which is designed for loading case dispensers with money, it is not essential that the cassettes are put in containers 4 and the cassettes themselves may be made in the shape of a container.

In order to reduce the weight of the drum system, instead of massive drums 26 and 29, use may also be made of drums which are essentially tube-shaped.

Figure 6:
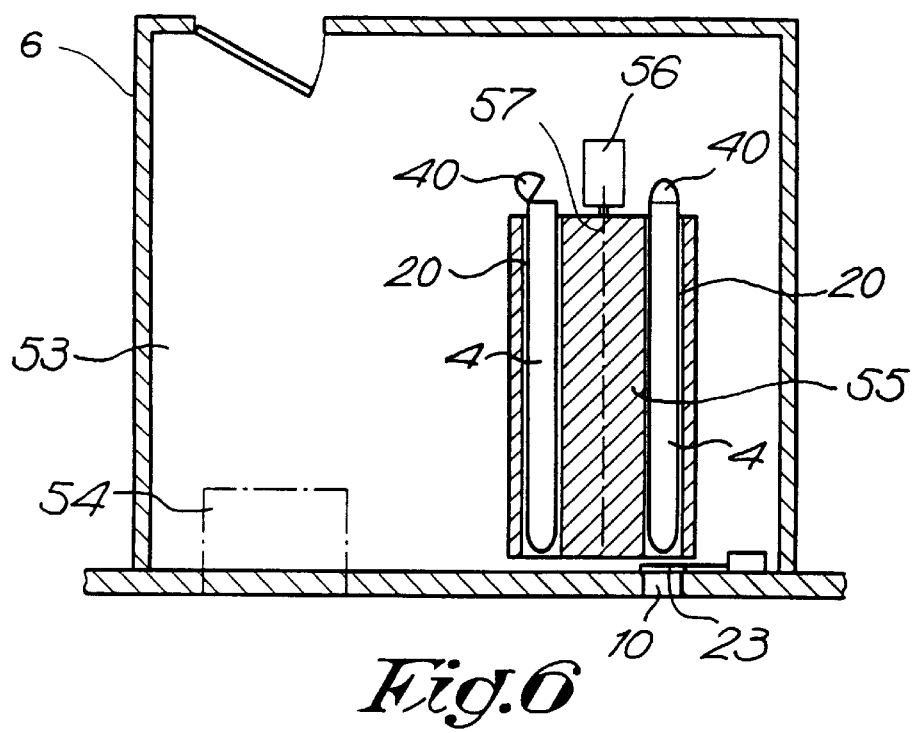
FIG. 6 represents a schematical top view of a variant of the part represented in FIG. 3.

In FIG. 6, a variant is represented whereby station 6 is mainly formed by technical room 53 which may only be accessed by authorized personnel and which is preferably adequately secured against burglary.

In case the apparatus is designed, among other things, for delivering money to institutions which are provided with a cash dispenser 54, cash dispenser 54 and space 20 in which container 4 may be received will be included in technical room 54, as is schematically represented in FIG. 6. It is clear that this may also apply to two interconnecting technical rooms.

According to a particular characteristic of the invention as represented in FIG. 6, space 20 will be part of a receptacle 55 which is realized in such a way that, after container 4 has been taken up therein, container 4 is directed outward with a part thereof, preferably head 40, sticking out of receptacle 55, in such a way that container 4, while present in space 20, may be opened and emptied, filled respectively. This offers the advantage that container 4, which has a heavy weight, need never be moved by persons.

As represented in FIG. 6, receptacle 55 may be realized in the shape of a magazine which contains several spaces 20 which may be positioned at will in front of corresponding gate 10 in such a way that when full container 4 has been taken up in space 20 out of vehicle 2, another container 4, which may be empty or not, subsequently may be brought from receptacle 55 into vehicle 2. According to FIG. 6, receptacle 55 is to this end realized in the shape of a drum which, for instance by a motor 56, may rotate along a horizontal shaft 57.

It is clear that receptacle 55 in the shape of a magazine may also be used in case no technical room 53 is present.

Figure 7:
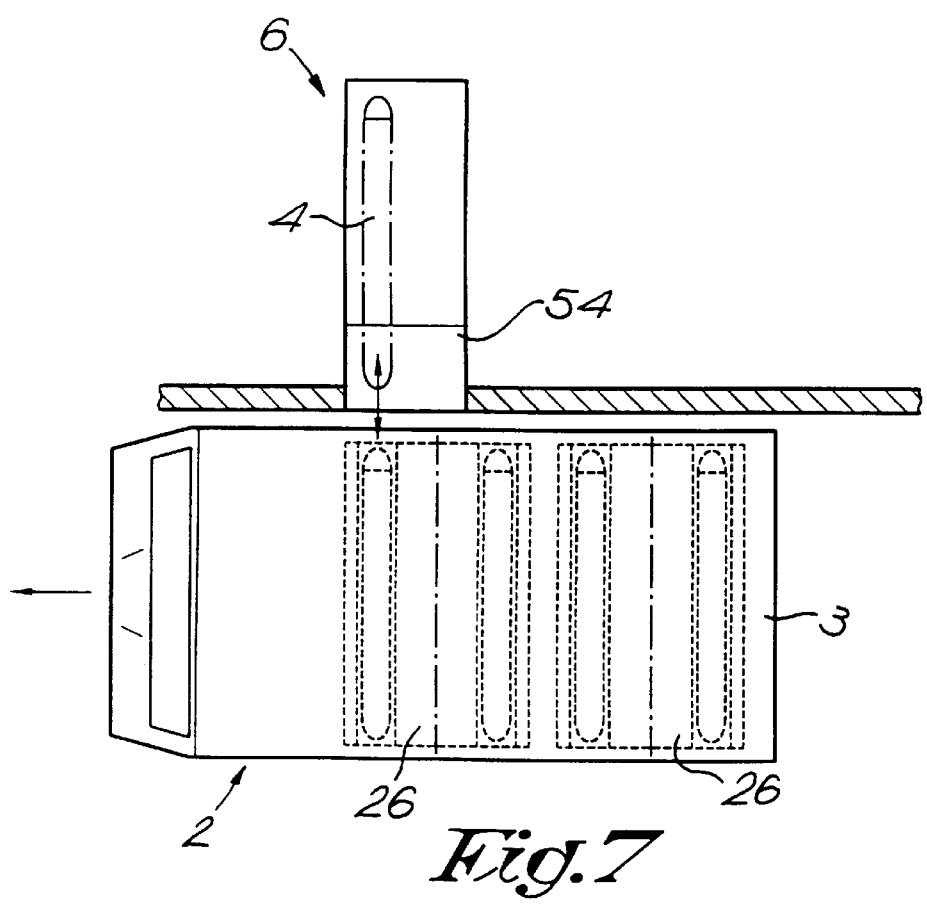
FIG. 7 represents another variant of an apparatus according to the invention.

As represented in FIG. 7, it is not excluded, instead of transferring containers 4 in the longitudinal direction of vehicle 2 to station 6, to transfer them in the transversal direction of vehicle 2, whereby vehicle 2 needs to be positioned sideways along the wall of the concerned building during loading and unloading. Station 6 may also in this case comprise a container with one ore more spaces 20 and/or technical room 53 and/or cash dispenser 54.

Furthermore, it is not excluded to transport containers 4 not according to their longitudinal direction, but to transfer them sideways from vehicle 2 to station 6, or vice versa.

It is clear that cases, or cassettes, 44 may be provided with a system for self-destruction and/or destruction of the contents, which may or may not be triggered automatically in case unauthorized persons try to take hold of container 4, of cases 44 or of the contents of cases 44.

Known cases 44, also called boxes, generally have contact points with which they may be connected to a system which allows communication with cases 44, for instance, if necessary, to trigger a destruction. In the case of the present invention, containers 4, as schematically represented in FIG. 5, may internally be provided with a plurality of contact points 58 which automatically come into contact with a plurality of corresponding contact points 59 of cases 44 and which are connected by an electric connection 60 to a suitable circuit for triggering said destruction, whereby the connection with the surroundings may or may not be realized in a wireless way. An advantage hereof is that the generally very sensitive corresponding contact points 59 of cases 44 are difficult to dirty by atmospheric pollution, because cases 44 are hidden in container 4.

It is to be noted that oblong containers 4 in the first instance relate to containers with a minimum length of one meter, and even better 1.5 meters. A practical diameter of containers 4 is between 30 and 40 centimeters.

Cases 44 may instead of a rectangular cross-section also have a round or other cross-section.

Finally it is noted that a great advantage of the preferred embodiment of the invention resides in that transport system 7 is of a mechanical or electro-mechanical nature, resulting in that, on the one hand, the incertainties of a pneumatic transport system are excluded and, on the other hand, it is possible to transport relatively heavy containers.

It is also noted that according to the invention gate 8 is preferably located at the height of the outer wall of vehicle 2 and that gate 8 may co-operate directly with corresponding gate 10 at wall 11 of a building, in other words without use of intermediate parts such as tubes or the like which could form a weak link in the whole.

It is to be noted that gate 8 may be any kind of loading and unloading opening.

Corresponding gate 10 may be any kind of passage which allows for container 4 to be received in station 6 or removed from station 6.

Finally the invention also relates to a cash dispenser with the characteristic that it is provided with an automatic loading system which allows the cash dispenser to be loaded from the outside, preferably by an apparatus as described above.

The present invention is in no way limited to the embodiments described above and represented in the drawings, but such device for transporting valuables may be realized in various shapes and dimensions without leaving the scope of the invention.

What is claimed is:

1. An apparatus for transporting valuables, comprising:
    a vehicle provided with a loading space;
    a plurality of containers for valuables, said containers being receivable in and removable from said loading space; and
    a loading arrangement for loading said containers into said loading space and removing said containers from said loading space;
    wherein said loading space is a drum system having a revolving drum which includes a plurality of secondary drums which revolve therein, said secondary drums being provided with a plurality of storage rooms.

2. An apparatus for transporting valuables according to claim 1, wherein said revolving drum and said secondary drums revolve around a rotating shaft and a plurality of rotating shafts, respectively, which extend in a longitudinal direction of said vehicle.

3. An apparatus for transporting valuables according to claim 2, wherein said loading space has an access opening at a front wall thereof, said access opening being situated to correspond to a lowest position of said storage rooms and connecting in a direct line to a channel extending from said loading space.

4. An apparatus for transporting valuables according to claim 1 wherein said containers for valuables have one or more of the properties selected from the group of properties consisting of being oblong receptacles in the shape of a torpedo, having a length of at least one meter, having a weight of at least 150 kilograms when empty and having internal contact points making any electrical contact/communication with a plurality of cases which are received in said containers.

5. An apparatus for transporting valuables according to claim 4, wherein said containers include an openable head with a lock which prevents opening said head other than by a code.

6. An apparatus for transporting valuables according to claim 1, wherein said apparatus is connected to a data network/computer unit at said station such that said containers which are delivered are openable only by an appropriate code.

7. An apparatus for transporting valuables according to claim 1, further comprising:
    at least one station for loading/unloading said containers;
    a vehicle gate at the height of an outer wall of said vehicle; and
    a corresponding station gate in a wall of said station, both of said gates being situated such that both gates are positioned opposite each other by positioning said vehicle relative to said station with said outer wall of said vehicle and vehicle gate located directly in front of said wall of said station and corresponding station gate;
    wherein said loading arrangement comprises a transport system for said containers which comprises a channel extending from said loading space to said vehicle gate and is arranged to form a connection between said station and said vehicle to transport said containers between said station and said vehicle, said loading space is located behind a driver's cabin of said vehicle, and said channel extends completely under said driver's cabin.

8. An apparatus for transporting valuables according to claim 7, further comprising:
    movable shutters which close off at least one of said gates.

9. An apparatus for transporting valuables according to claim 1, further comprising:
    at least one station for loading/unloading said containers;
    wherein said loading arrangement comprises a transport system for said containers, said transport system being arranged to form a connection between said station and said vehicle to transport said containers between said station and said vehicle; and
    wherein said transport system comprises a vehicle gate at the height of an outer wall of said vehicle and a corresponding station gate in a wall of said station, both of said gates being situated such that both gates are positioned opposite each other by positioning said vehicle relative to said station with said outer wall of said vehicle and vehicle gate located directly in front of said wall of said station and corresponding station gate.

10. An apparatus for transporting valuables according to claim 9, wherein said outer wall of said vehicle is located at the front end of said vehicle.

11. An apparatus for transporting valuables according to claim 9, further comprising:
    a positioning system which facilitates proper positioning of said vehicle relative to said station such that said vehicle and station gates are aligned.

12. An apparatus for transporting valuables according to claim 1, wherein said loading space includes a locking mechanism arranged such that said containers are locked in place.

13. An apparatus for transporting valuables, comprising:

a vehicle provided with a loading space;

a plurality of containers for valuables, said containers being receivable in and removable from said loading space; and a loading arrangement for loading said containers into said loading space and removing said containers from said loading space;

wherein said loading space includes a locking mechanism arranged such that said containers are locked in place, said locking mechanism comprising a plurality of diaphragm/iris-shaped clamping elements which close around said container.

14. An apparatus for transporting valuables according to claim 13, wherein said apparatus is connected to a data network/computer unit at said station such that said containers which are delivered are openable only by an appropriate code.

15. An apparatus for transporting valuables, comprising:

a vehicle provided with a loading space;

a plurality of containers for valuables, said containers being receivable in and removable from said loading space;

a loading arrangement for loading said containers into said loading space and removing said containers from said loading space, said loading arrangement comprising a transport system for said containers; and at least one station for loading/unloading said containers;

wherein said transport system is arranged to form a connection between said station and said vehicle to transport said containers between said station and said vehicle and said station comprises a cash dispenser for use with an automatic loading system which enables money delivered by said containers to be automatically inserted in said cash dispenser and wherein said apparatus is connected to a data network/computer unit at said station such that said containers which are delivered are openable only by an appropriate code.

* * * * *